June 19, 1962 R. W. WARING ET AL 3,039,897
SEMICONDUCTOR AND METHOD OF MAKING THE SAME
Filed April 9, 1958
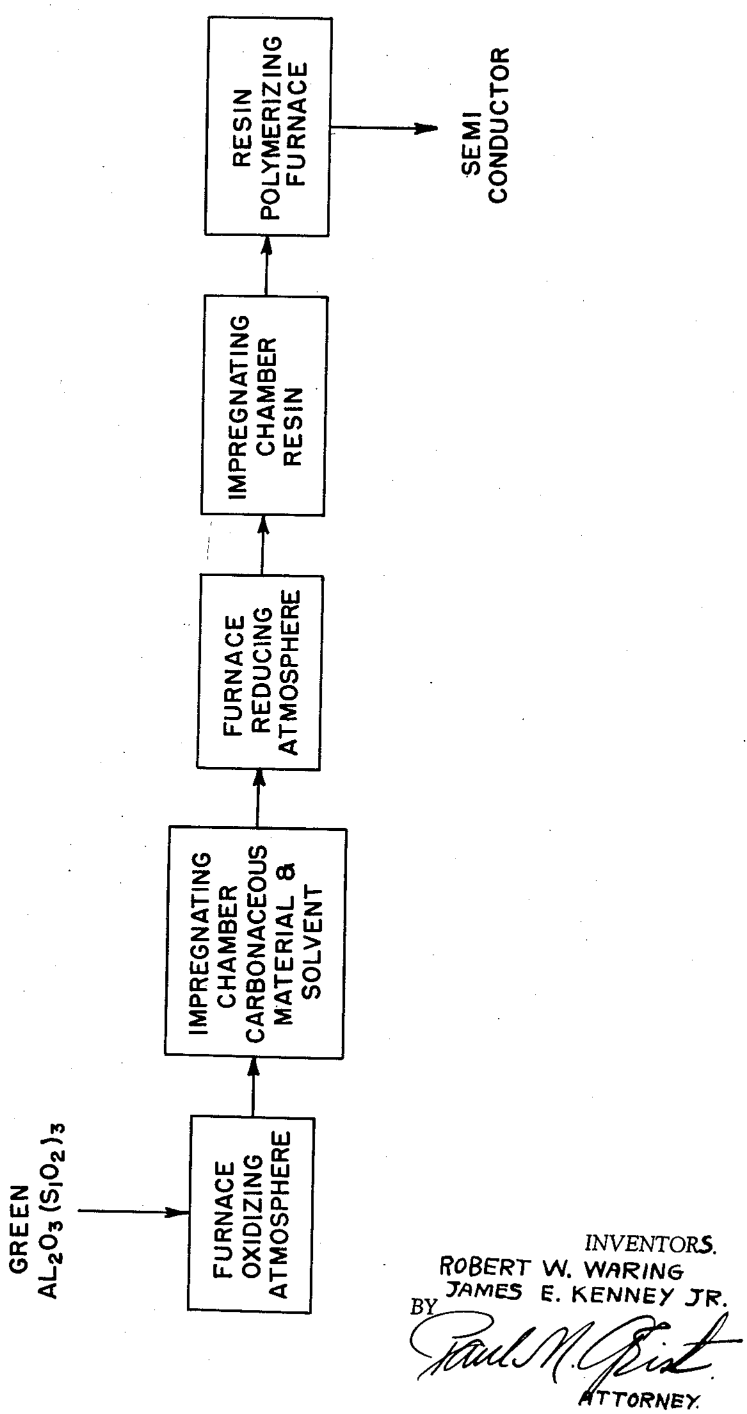
INVENTORS.
ROBERT W. WARING
JAMES E. KENNEY JR.
BY Paul M. Crist
ATTORNEY.

United States Patent Office 3,039,897 Patented June 19, 1962

3,039,897

SEMICONDUCTOR AND METHOD OF MAKING THE SAME

Robert W. Waring and James E. Kenney, Jr., Fairfield, Conn.; said Kenney assignor, by mesne assignments, to said Robert W. Waring Filed Apr. 9, 1958, Ser. No. 727,284
24 Claims. (Cl. 117—226)

The present invention relates to electrical semiconductors, and particularly to a new and improved semiconductor. A semiconductor, for the purposes of this application, is defined as a material having a resistivity of between substantially $10^2$ and $10^{10}$ ohm centimeters at normal temperatures.

The invention also deals with the method of making such a semiconductor having uniform and stable resistivity throughout its volume, and capable of being reproduced with a relatively small tolerance of volumetric resistivity.

More specifically, the invention deals with the making of such a semiconductor capable of use with an electrostatic apparatus for producing substantial mechanical forces between it and conducting or other semiconducting objects. Examples of the use to which such semiconductors may be put are shown, described and claimed in United States Patents 2,897,424 and 2,897,425, granted July 28, 1959.

Limestone is a natural semiconductor capable of use in an electrostatic apparatus for producing forces of attraction between it and a conducting object. With such a semiconductor in contact with a conducting object and a properly constructed interface therebetween that is capable of separating electric charges, the application of a potential difference to the semiconductor and the conducting object will produce a uniform electrical field at the interface. Such electrical field may, however, be of an unstable character.

One of the principal objects of this invention is to produce a semiconductor that will develop a uniform electrical field at a properly constructed interface in contact with conducting or other semiconducting objects for extended periods of time.

Another object of this invention is to provide a semiconductor that is made up from a body of porous insulating material throughout which an electrical conducting material has been dispersed.

Another object is to produce a semiconductor which may be readily fabricated in substantial sizes and various shapes.

In one aspect of the invention, a ceramic material possessing the desired hardness, structure and shape may be impregnated with a carbonaceous, decomposable material.

The impregnated body may then be subjected to a temperature sufficient to decompose the carbonaceous material. The body may then be subjected to an elevated temperature to produce the desired volume resistivity.

The resulting product is a semiconductor. Finally, the semiconductor may be impregnated to fill any residual porosity with a material capable of being polymerized into a higher molecular weight substance.

The above, other objects and novel features of the semiconductor and method of making the same will become apparent from the following specification and accompanying drawing which is merely exemplary.

In the drawing:

The FIGURE is a block diagram of the steps in the method of making the semiconductor.

By way of example only, a semiconducting article may be made from certain grades of natural aluminum silicate which may be readily machined to any desired shape. With this material it has been found that the necessary physical properties can be obtained by heat treatment when fired in an oxidizing atmosphere such as air.

The resulting article is a ceramic body possessing relatively uniform porosity and fine grain structure. It also possesses adequate strength and hardness for industrial applications. It is an excellent insulator, having an electrical volume resistivity well in excess of $10^{10}$ ohm centimeters.

The porous ceramic body may then be submerged in a solution of a carbonaceous, decomposable material and a solvent. The boiling point of the solvent is above the decomposition temperature of the carbonaceous material. While it is evident that various carbonaceous, decomposable materials may be employed with various solvents having the qualifications above specified to produce the specific results desired, it has been found that various sugar-glycerol combinations satisfy the requirements of the semiconductor forming the article of the present invention. By way of example only, a true solution of between about 5 to 25 parts by weight of sucrose per 100 parts of glycerol can be obtained by stirring the sucrose into the glycerol at about 70° to 80° C.

While the impregnation of the porous ceramic body with the solution may be achieved at atmospheric pressure and room temperature if time is not of the essence, it preferably is done at an elevated temperature and pressure. The process time should be long enough to insure complete impregnation.

In order to permit escape of residual air or gas that might be entrapped within the porous body, the pressure may be released and the solution containing the body maintained at the elevated temperature. Upon subsequent cooling to room temperature, the impregnated body may remain submerged for an additional period to compensate for thermal contraction of the solution within the body.

The impregnated body may then be heated within a furnace in a non-oxidizing atmosphere, such as nitrogen, helium or the like, to a temperature and for a time such that the carbonaceous material will be largely decomposed.

The temperature then may be increased to change the decomposed carbonaceous material toward an increasingly graphitic structure, thereby producing the desired conductivity. The body may then be furnace cooled to room temperature.

The pressure impregnation of the body with the carbonaceous material and the subsequent heating and cooling above described produce a relatively uniform dispersion of conducting carbon throughout the matrix. Should it be desired to reduce the resistivity more than the amount incident to the above steps, the impregnating and heating cycles may be repeated until the desired value is reached.

The resulting body may possess a carbon-rich, high conductivity surface which can be removed, preferably mechanically, e.g., by grinding off a few thousandths of an inch of each surface of the body.

Should the volume resistivity from piece to piece vary upwardly due to slight differences in basic material or processing, the volume resistivity may be lowered by reheating the body to temperatures in excess of the original temperature to produce an increasingly graphitic structure depending upon the amount of reduction in volume resistivity desired.

The resulting semiconductor may still embody a degree of porosity which might result in internal contamination in service. This may be avoided by further impregnating the body with a low polymer plastic resin. Accordingly, the body may be placed within a pressure vessel which may then be subjected to a vacuum. While the vacuum is being pulled on the semiconductor, a resin may be introduced into the vessel. Subsequently, the vacuum is relieved and an elevated pressure is applied to the interior of the vessel containing the resin submerged body and at a temperature suitable for the resin employed to prevent it from setting up during the impregnating step.

Finally, the body may be baked at a suitable elevated temperature to polymerize the resin in situ.

The resulting product may be used alone or in combination by joining two or more together by cementing them with a resin made especially for the purpose, e.g., the well known epoxies, or by the resin used to fill the remaining voids.

Although the principles of the new and improved semiconductor and the method of making the same have been described in detail to fully disclose one embodiment of the invention, it will be evident that numerous changes may be made in such details, and certain features may be used without others without departing from the principles of the invention.

What is claimed is:

1. A semiconductor capable of use with an electrostatic apparatus for producing substantial mechanical forces between it and conducting or other semiconducting objects, comprising a solid porous electrically insulating matrix; an electronic conducting material substantially uniformly dispersed therethrough, constituting the sole conducting material therein, to provide a uniform and stable resistivity within the range of from $10^2$ to $10^{10}$ ohm centimeters throughout its volume within a relatively small tolerance of volumetric resistivity; and a polymerized plastic resin within said matrix.

2. A semiconductor capable of use with an electrostatic apparatus for producing substantial mechanical forces between it and conducting or other semiconducting objects, comprising a solid electrically insulating material having a uniform, relatively fine grain structure providing a porous matrix; an electronic conducting material substantially uniformly dispersed therethrough, constituting the sole conducting material therein, to provide a uniform and stable resistivity within the range of from $10^2$ to $10^{10}$ ohm centimeters throughout its volume within a relatively small tolerance of volumetric resistivity; and a polymerized plastic resin within said matrix.

3. A semiconductor capable of use with an electrostatic apparatus for producing substantial mechanical forces between it and conducting or other semiconducting objects, comprising a solid porous matrix having a volume resistivity in excess of substantially $10^{10}$ ohm centimeters; an electronic conducting material substantially uniformly dispersed therethrough, constituting the sole conducting material therein, to provide a uniform and stable resistivity within the range of from $10^2$ to $10^{10}$ ohm centimeters throughout its volume within a relatively small tolerance of volumetric resistivity; and a polymerized plastic resin within said matrix.

4. A semiconductor capable of use with an electrostatic apparatus for producing substantial mechanical forces between it and conducting or other semiconducting objects, comprising a solid material having a uniform, relatively fine grain structure providing a porous matrix and having a volume resistivity in excess of about $10^{10}$ ohm centimeters; an electronic conducting material substantially uniformly dispersed therethrough, constituting the sole conducting material therein, to provide a uniform and stable resistivity within the range of from $10^2$ to $10^{10}$ ohm centimeters throughout its volume within a relatively small tolerance of volumetric resistivity; and a polymerized plastic resin within said matrix.

5. A semiconductor capable of use with an electrostatic apparatus for producing substantial mechanical forces between it and conducting or other semiconducting objects, comprising a solid porous electrically insulating matrix; a conducting residue of a decomposed carbon-rich material substantially uniformly dispersed therethrough, constituting the sole conducting material therein, to provide a uniform and stable resistivity within the range of from $10^2$ to $10^{10}$ ohm centimeters throughout its volume within a relatively small tolerance of volumetric resistivity; and a polymerized plastic resin within said matrix.

6. A semiconductor capable of use with an electrostatic apparatus for producing substantial mechanical forces between it and conducting or other semiconducting objects, comprising a solid electrically insulating material having a uniform, relatively fine grain structure providing a porous matrix; a conducting residue of a decomposed carbon-rich material substantially uniformly dispersed therethrough, constituting the sole conducting material therein, to provide a uniform and stable resistivity within the range of from $10^2$ to $10^{10}$ ohm centimeters throughout its volume within a relatively small tolerance of volumetric resistivity; and a polymerized plastic resin within said matrix.

7. A semiconductor capable of use with an electrostatic apparatus for producing substantial mechanical forces between it and conducting or other semiconducting objects, comprising a solid porous matrix having a volume resistivity in excess of substantially $10^{10}$ ohm centimeters; a conducting residue of a decomposed carbon-rich material substantially uniformly dispersed therethrough, constituting the sole conducting material therein, to provide a uniform and stable resistivity within the range of from $10^2$ to $10^{10}$ ohm centimeters throughout its volume within a relatively small tolerance of volumetric resistivity; and a polymerized plastic resin within said matrix.

8. A semiconductor capable of use with an electrostatic apparatus for producing substantial mechanical forces between it and conducting or other semiconducting objects, comprising a solid material having a uniform, relatively fine grain structure providing a porous matrix and having a volume resistivity in excess of about $10^{10}$ ohm centimeters; a conducting residue of a decomposed carbon-rich material substantially uniformly dispersed therethrough, constituting the sole conducting material therein, to provide a uniform and stable resistivity within the range of from $10^2$ to $10^{10}$ ohm centimeters throughout its volume within a relatively small tolerance of volumetric resistivity; and a polymerized plastic resin within said matrix.

9. A semiconductor capable of use with an electrostatic apparatus for producing substantial mechanical forces between it and conducting or other semiconducting objects, comprising a body of aluminum silicate forming a porous matrix; an electronic conducting material substantially uniformly dispersed therethrough, constituting the sole conducting material therein, to provide a uniform and stable resistivity within the range of from $10^2$ to $10^{10}$ ohm centimeters throughout its volume within a relatively small tolerance of volumetric resistivity; and a polymerized plastic resin within said matrix.

10. A semiconductor capable of use with an electrostatic apparatus for producing substantial mechanical forces between it and conducting or other semiconducting objects, comprising a body of aluminum silicate forming a porous matrix having a volume resistivity in excess of substantially $10^{10}$ ohm centimeters; an electronic conducting material substantially uniformly dispersed therethrough, constituting the sole conducting material therein, to provide a uniform and stable resistivity within the range of from $10^2$ to $10^{10}$ ohm centimeters throughout its volume within a relatively small tolerance of volumetric resistivity; and a polymerized plastic resin within said matrix.

11. A semiconductor capable of use with an electrostatic apparatus for producing substantial mechanical forces between it and conducting or other semiconducting objects, comprising a body of aluminum silicate forming a porous matrix; a decomposed carbonaceous material substantially uniformly dispersed therethrough, constituting the sole conducting material therein, to provide a uniform and stable resistivity within the range of from $10^2$ to $10^{10}$ ohm centimeters throughout its volume within a relatively small tolerance of volumetric resistivity; and a polymerized plastic resin within said matrix.

12. A semiconductor capable of use with an electrostatic apparatus for producing substantial mechanical forces between it and conducting or other semiconducting objects, comprising a body of aluminum silicate forming a porous matrix having a volume resistivity in excess of substantially $10^{10}$ ohm centimeters; a decomposed carbonaceous material substantially uniformly dispersed therethrough, constituting the sole conducting material therein, to provide a uniform and stable resistivity within the range of from $10^2$ to $10^{10}$ ohm centimeters throughout its volume within a relatively small tolerance of volumetric resistivity; and a polymerized plastic resin within said matrix.

13. The method of making a semiconductor capable of use with an electrostatic apparatus for producing substantial mechanical forces between it and conducting or other semiconducting objects, which comprises impregnating a porous solid body of electrically insulating material with a solution of a carbonaceous decomposable material and a solvent, the boiling point of which solvent is above substantially the decomposition temperature of the carbon-rich material; heating said impregnated body to a temperature sufficient to decompose said carbon-rich material, but below substantially the boiling point of said solvent; and subsequently heating said body to a temperature sufficient to evaporate said solvent and to form a conducting material within said body to provide a uniform and stable resistivity within the range of between $10^2$ and $10^{10}$ ohm centimeters throughout its volume within a relatively small tolerance of volumetric resistivity.

14. The method of making a semiconductor capable of use with an electrostatic apparatus for producing substantial mechanical forces between it and conducting or other semiconducting objects, which comprises impregnating a porous solid body of electrically insulating material with a solution of a carbonaceous decomposable material and a solvent, the boiling point of which solvent is above substantially the decomposition temperature of the carbon-rich material; heating said impregnated body to a temperature sufficient to decompose said carbon-rich material, but below substantially the boiling point of said solvent; subsequently heating said body to a temperature sufficient to evaporate said solvent and to form a conducting material within said body to provide a uniform and stable resistivity within the range of between $10^2$ and $10^{10}$ ohm centimeters throughout its volume within a relatively small tolerance of volumetric resistivity.; impregnating said body with a low polymer resin; and polymerizing said resin in situ.

15. The method of making a semiconductor capable of use with an electrostatic apparatus for producing substantial mechanical forces between it and conducting or other semiconducting objects, which comprises impregnating a body of aluminum silicate with a solution of a carbonaceous decomposable material and a solvent, the boiling point of which solvent is above substantially the decomposition temperature of the carbon-rich material; heating said impregnated body to a temperature sufficient to decompose said carbon-rich material, but below substantially the boiling point of said solvent; and subsequently heating said body to a temperature sufficient to evaporate said solvent and to form a conducting material within said body to provide a uniform and stable resistivity within the range of between $10^2$ and $10^{10}$ ohm centimeters throughout its volume within a relatively small tolerance of volumetric resistivity.

16. The method of making a semiconductor capable of use with an electrostatic apparatus for producing substantial mechanical forces between it and conducting or other semiconducting objects, which comprises impregnating a body of aluminum silicate with a solution of a carbonaceous decomposable material and a solvent, the boiling point of which solvent is above substantially the decomposition temperature of the carbon-rich material; heating said impregnated body to a temperature sufficient to decompose said carbon-rich material, but below substantially the boiling point of said solvent; subsequently heating said body to a temperature sufficient to evaporate said solvent and to form a conducting material within said body to provide a uniform and stable resistivity within the range of between $10^2$ and $10^{10}$ ohm centimeters throughout its volume within a relatively small tolerance of volumetric resistivity; impregnating said body with a low polymer resin; and polymerizing said resin in situ.

17. The method of making a semiconductor capable of use with an electrostatic apparatus for producing substantial mechanical forces between it and conducting or other semiconducting objects, which comprises impregnating a porous solid body of electrically insulating material with a solution of sucrose and glycerol; heating said impregnated body to a temperature sufficient to decompose said sucrose without boiling off a substantial quantity of said glycerol; and subsequently heating said body to a temperature sufficient to evaporate said glycerol and to form a conducting material within said body to provide a uniform and stable resistivity within the range of between $10^2$ and $10^{10}$ ohm centimeters throughout its volume within a relatively small tolerance of volumetric resistivity.

18. The method of making a semiconductor capable of use with an electrostatic apparatus for producing substantial mechanical forces between it and conducting or other semiconducting objects, which comprises impregnating a body of aluminum silicate with a solution of sucrose and glycerol; heating said impregnated body to a temperature sufficient to decompose said sucrose without boiling off a substantial quantity of said glycerol; and subsequently heating said body to a temperature sufficient to evaporate said glycerol and to form a conducting material within said body to provide a uniform and stable resistivity within the range of between $10^2$ and $10^{10}$ ohm centimeters throughout its volume within a relatively small tolerance of volumetric resistivity.

19. The method of making a semiconductor capable of use with an electrostatic apparatus for producing substantial mechanical forces between it and conducting or other semiconducting objects, which comprises impregnating a porous solid body of electrically insulating material with a solution of sucrose and glycerol; heating said impregnated body to a temperature sufficient to decompose said sucrose without boiling off a substantial quantity of said glycerol; subsequently heating said body to a temperature sufficient to evaporate said glycerol and to form a conducting material within said body to provide a uniform and stable resistivity within the range of between $10^2$ and $10^{10}$ ohm centimeters throughout its volume within a relatively small tolerance of volumetric resistivity; impregnating said body with a low polymer resin; and polymerizing said resin in situ.

20. The method of making a semiconductor capable of use with an electrostatic apparatus for producing substantial mechanical forces between it and conducting or other semiconducting objects, which comprises impregnating a body of aluminum silicate with a solution of sucrose and glycerol; heating said impregnated body to a temperature sufficient to decompose said sucrose without boiling off a substantial quantity of said glycerol; subsequently heating said body to a temperature sufficient to evaporate said glycerol and to form a conducting material within said body to provide a uniform and stable resistivity within the range of between $10^2$ and $10^{10}$ ohm centimeters throughout its volume within a relatively small tolerance of volumetric resistivity; impregnating said body with a low polymer resin; and polymerizing said resin in situ.

21. The method of making a semiconductor capable of use with an electrostatic apparatus for producing substantial mechanical forces between it and conducting or other semiconducting objects, which comprises the steps of impregnating a porous solid body of electrically insulating material with a solution of between about 5 to 25 parts per 100 parts by weight of sucrose in glycerol; heating said impregnated body in a non-oxidizing atmosphere to decompose said sucrose and to evaporate said glycerol and to form a conducting material within said body to provide a uniform and stable resistivity within the range of between $10^2$ and $10^{10}$ ohm centimeters throughout its volume within a relatively small tolerance of volumetric resistivity; and cooling said body to room temperature.

22. The method of making a semiconductor capable of use with an electrostatic apparatus for producing substantial mechanical forces between it and conducting or other semiconducting objects, which comprises the steps of impregnating a porous solid body of electrically insulating material with a solution of between about 5 to 25 parts per 100 parts by weight of sucrose in glycerol; heating said impregnated body in a non-oxidizing atmosphere to decompose said sucrose and to evaporate said glycerol and to form a conducting material within said body to provide a uniform and stable resistivity within the range of between $10^2$ and $10^{10}$ ohm centimeters throughout its volume within a relatively small tolerance of volumetric resistivity; cooling said body to room temperature; impregnating said body with a low polymer resin; and polymerizing said resin in situ.

23. The method of making a semiconductor capable of use with an electrostatic apparatus for producing substantial mechanical forces between it and conducting or other semiconducting objects, which comprises the steps of impregnating a body of aluminum silicate with a solution of between about 5 to 25 parts per 100 parts by weight of sucrose in glycerol; heating said impregnated body in a non-oxidizing atmosphere to decompose said sucrose and to evaporate said glycerol and to form a conducting material within said body to provide a uniform and stable resistivity within the range of between $10^2$ and $10^{10}$ ohm centimeters throughout its volume within a relatively small tolerance of volumetric resistivity; and cooling said body to room temperature.

24. The method of making a semiconductor capable of use with an electrostatic apparatus for producing substantial mechanical forces between it and conducting or other semiconducting objects, which comprises the steps of impregnating a body of aluminum silicate with a solution of between about 5 to 25 parts per 100 parts by weight of sucrose in glycerol; heating said impregnated body in a non-oxidizing atmosphere to decompose said sucrose and to evaporate said glycerol and to form a conducting material within said body to provide a uniform and stable resistivity within the range of between $10^2$ and $10^{10}$ ohm centimeters throughout its volume within a relatively small tolerance of volumetric resistivity; cooling said body to room temperature; impregnating said body with a low polymer resin; and polymerizing said resin in situ.

References Cited in the file of this patent

UNITED STATES PATENTS

| | | |
|---|---|---|
| 490,954 | Edison | Jan. 31, 1893 |
| 963,291 | Horton | July 5, 1910 |
| 2,407,868 | Burke | Sept. 17, 1946 |
| 2,880,120 | Pelle | Mar. 31, 1959 |

FOREIGN PATENTS

| | | |
|---|---|---|
| 757,883 | Great Britain | Sept. 26, 1956 |

OTHER REFERENCES

Warren: Electrical Insulating Materials, page 72 relied on, 1931, Ernest Benn Limited, London.